(12) United States Patent
Gold

(10) Patent No.: US 8,924,664 B2
(45) Date of Patent: Dec. 30, 2014

(54) LOGICAL OBJECT DELETION

(71) Applicant: Infinidat Ltd., Hertzelia (IL)

(72) Inventor: Israel Gold, Haifa (IL)

(73) Assignee: Infinidat Ltd., Hertzelia (IL)

( * ) Notice: Subject to any disclaimer, the term of this patent is extended or adjusted under 35 U.S.C. 154(b) by 168 days.

(21) Appl. No.: 13/713,069

(22) Filed: Dec. 13, 2012

(65) Prior Publication Data

US 2014/0173226 A1 Jun. 19, 2014

(51) Int. Cl.
*G06F 12/12* (2006.01)
*G06F 3/06* (2006.01)
*G06F 17/30* (2006.01)

(52) U.S. Cl.
CPC ............ *G06F 3/06* (2013.01); *G06F 17/30117* (2013.01)
USPC .......................................................... 711/159

(58) Field of Classification Search
None
See application file for complete search history.

(56) References Cited

U.S. PATENT DOCUMENTS

| 2002/0078244 | A1* | 6/2002 | Howard | 709/248 |
| 2005/0165871 | A1* | 7/2005 | Barrs et al. | 707/205 |
| 2008/0177802 | A1* | 7/2008 | Haye et al. | 707/202 |
| 2008/0307155 | A1* | 12/2008 | Sinclair | 711/103 |

* cited by examiner

*Primary Examiner* — Duc Doan
(74) *Attorney, Agent, or Firm* — Oren Reches

(57) ABSTRACT

The presently disclosed subject matter includes a method and system for enabling the deletion of logical objects characterized by an object identifier (OID). Upon restart following a system interruption, one or more logical objects are identified, each object being addressed by an interrupted delete request. For each identified logical object performing a deletion, the deletion including: reading one or more physical blocks stored in a physical storage space, wherein the one or more physical blocks were linked to the identified logical object before the system interruption, each of the physical blocks includes an OID stored therein indicating a logical object currently linked to the respective physical block; obtaining OIDs stored respectively in the one or more physical blocks; and freeing those physical blocks from among the one or more physical blocks, which store an OID identical to the respective OID of the identified logical object.

18 Claims, 5 Drawing Sheets

LOGICAL OBJECT DELETION

FIELD OF THE PRESENTLY DISCLOSED SUBJECT MATTER

The presently disclosed subject matter is related to deletion of data objects in a computer storage system.

BACKGROUND

Logical objects (such as files and directories) comprise a collection of logical data blocks which correspond to physical data blocks in the computer storage. Logical data blocks in a logical object are commonly organized using block maps for mapping offsets within an object to respective block addresses within a related logical volume. Such a block map may be included in a metadata structure (e.g. index node, or Mode) that describes the logical object or can be referred by the Mode. The block map can be a hierarchical mapping data structure, e.g. a B-Tree. For example in a B-tree data structure, the Mode serves as the root of the tree, and each leaf in the tree points to either a data block or extent of blocks. The information of this block map is stored in metadata blocks.

Updating logical objects in a file system usually requires several separate operations, which expose the update process to possible system interruption resulting for example from a power failure or a system crash (referred herein in general as "system interruption"). A system interruption that occurs between writes of a deletion process may result in data structures, used for storing data blocks of respective objects, which are left in an invalid intermediate state.

For example a file deletion operation in a Unix file system typically involves the steps of: (i) removing the file's directory entry; (ii) marking the blocks associated with the file (including actual data blocks and metadata blocks) as free in a free space map; and (iii) marking the Mode entry of the file as free. Deletion of the blocks associated with an object involves scanning a mapping data-structure (e.g. a B-Tree block map) that holds all the data and metadata blocks of the object in order to delete each block included in that datastructure. A storage leak may occur, for example, if the Mode was marked as free but not all the blocks were marked as free, and a system interruption occurs during the deletion process of an object before all blocks have been deleted.

Some file systems are programmed to run consistency checks in order to obtain consistency of the file system after a system interruption. Typically, after the system restarts and before the file system is mounted for read and write access the file system executes a complete walk through the file system's data structures. For example, Linux and UNIX systems use fsck (file system consistency check) command to check file system consistency and repair it while Microsoft Windows equivalent commands are CHKDSK_and SCANDISK. This process is time and resource consuming.

Some file systems use Journaling, where changes that are going to be made in each transaction are recorded in a journal file before committing the changes to the main file system. For example all changes that are going to be made as part of a file deletion (all data blocks and metadata blocks to be deleted, the Mode entry to be freed, etc.) are written as one entry in the journal file. When the system is restarted after a system interruption, the transactions in the journal may be replayed or rolled back. Journaling file systems accelerate the time taken to repair the system, but have the disadvantage of increasing file-system operation latency and performing additional I/O operations for writing the journal.

Thus, there is a need in the art for additional solutions enabling to perform object deletion while maintaining data consistency and avoid memory leaks in case of a system interruption.

SUMMARY

According to an aspect of the presently disclosed subject matter there is provided a method of deleting logical object characterized by an object identifier (OID), the method comprising: upon restart following a system interruption, identifying one or more logical objects, each object being addressed by an interrupted delete request, which has been interrupted as a result of the system interruption; each of the one or more logical objects is identifiable by a respective OID; for each identified logical object of the identified one or more logical objects performing a deletion, the deletion comprising: a) reading one or more physical blocks stored in a physical storage space, wherein the one or more physical blocks were linked to the identified logical object before the system interruption, wherein each of the one or more physical blocks comprises an OID stored therein, the stored OID indicating a logical object currently linked to the respective physical block; b) obtaining OIDs stored respectively in the one or more physical blocks; and c) freeing physical blocks from among the one or more physical blocks, wherein the freed physical blocks store an OID identical to the respective OID of the identified logical object.

According to certain embodiments of the invention the method further comprising: receiving a write request in respect of a given logical object; allocating physical data blocks for writing data received in said write request;

adding to data to be written in each physical data block a respective object identifier of said given logical object; and writing to said physical storage said each physical data block together with the respective object identifier.

According to another aspect of the presently disclosed subject matter there is provided an object management system operatively connectible to a physical storage space in a storage system; the physical storage space constituted of a plurality of physical data blocks stored in one or more storage devices; the object management system enabling to represent data stored in the physical storage space as one or more logical objects; the object management system comprising at least one processor and a non-transitory storage medium in communication with the processor, said non-transitory storage medium storing machine instructions that cause the at least one processor to perform the following operations: upon restart following a system interruption, identify one or more logical objects, each object being addressed by an interrupted delete request, which has been interrupted as a result of the system interruption; each of the one or more logical objects is identifiable by a respective object identifier (OID); for each identified logical object from among the identified one or more logical objects perform a deletion, including: to read one or more physical blocks stored in the physical storage space, wherein the one or more physical blocks were linked to the identified logical object before the system interruption, wherein each of the one or more physical blocks comprises an OID stored therein, the stored OID indicating a logical object currently linked to the respective physical block; to obtain OIDs stored, respectively in the one or more physical blocks; and to free physical blocks from among the one or more physical blocks, wherein the freed physical blocks store an OID identical to the respective OID of the identified logical object.

According to certain embodiments the object management system is integrated as part of said storage system.

According to another aspect of the presently disclosed subject matter there is provided a storage system comprising an object management system and a physical storage space; the physical storage space constituted of a plurality of physical data blocks stored in one or more storage devices; the object management system enabling to represent data stored in the physical storage space as one or more logical objects; the object management system comprising at least one processor and a non-transitory storage medium in communication with the processor, said non-transitory storage medium storing machine instructions that cause the at least one processor to perform the following operations: upon restart following a system interruption, identify one or more logical objects, each object being addressed by an interrupted delete request, which has been interrupted as a result of the system interruption; each of the one or more logical objects is identifiable by a respective object identifier (OID); for each identified logical object from among the identified one or more logical objects perform a deletion, including: to read one or more physical blocks stored in the physical storage space, wherein the one or more physical blocks were linked to the identified logical object before the system interruption, wherein each of the one or more physical blocks comprises an OID stored therein, the stored OID indicating a logical object currently linked to the respective physical block; to obtain OIDs stored, respectively in the one or more physical blocks; and to free physical blocks from among the one or more physical blocks, wherein the freed physical blocks store an OID identical to the respective OID of the identified logical object.

According to yet another aspect of the presently disclosed subject matter there is provided a non-transitory program storage device readable by machine, tangibly embodying a program of instructions executable by the machine to perform method steps of a method of deleting logical object characterized by an object identifier (OID), the method comprising: upon restart following a system interruption, identifying one or more logical objects, each object being addressed by an interrupted delete request, which has been interrupted as a result of the system interruption; each of the one or more logical objects is identifiable by a respective OID; for each identified logical object of the identified one or more logical objects performing a deletion, the deletion comprising: a) reading one or more physical blocks stored in a physical storage space, wherein the one or more physical blocks were linked to the identified logical object before the system interruption, wherein each of the one or more physical blocks comprises an OID stored therein, the stored OID indicating a logical object currently linked to the respective physical block; b) obtaining OIDs stored respectively in the one or more physical blocks; and c) freeing physical blocks from among the one or more physical blocks, wherein the freed physical blocks store an OID identical to the respective OID of the identified logical object.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1A:
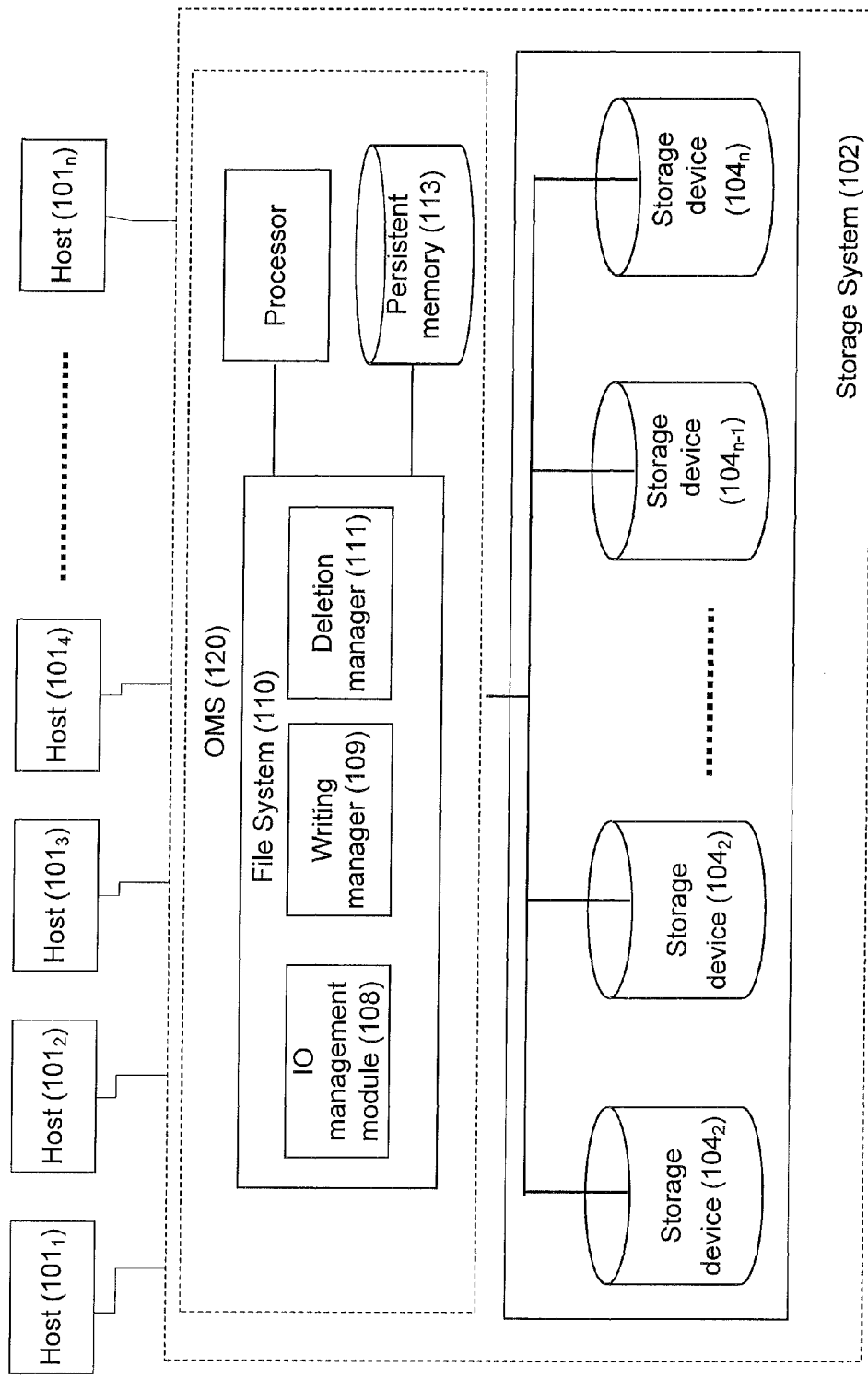
FIG. 1a illustrates a functional block diagram schematically illustrating an example of a computer storage system, according to the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "identifying", "reading", "obtaining", "freeing", "receiving", "allocating", "adding", "writing" or the like, include action and/or processes of a computer that manipulate and/or transform data into other data, said data represented as physical quantities, e.g. such as electronic quantities, and/or said data representing the physical objects.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1B:
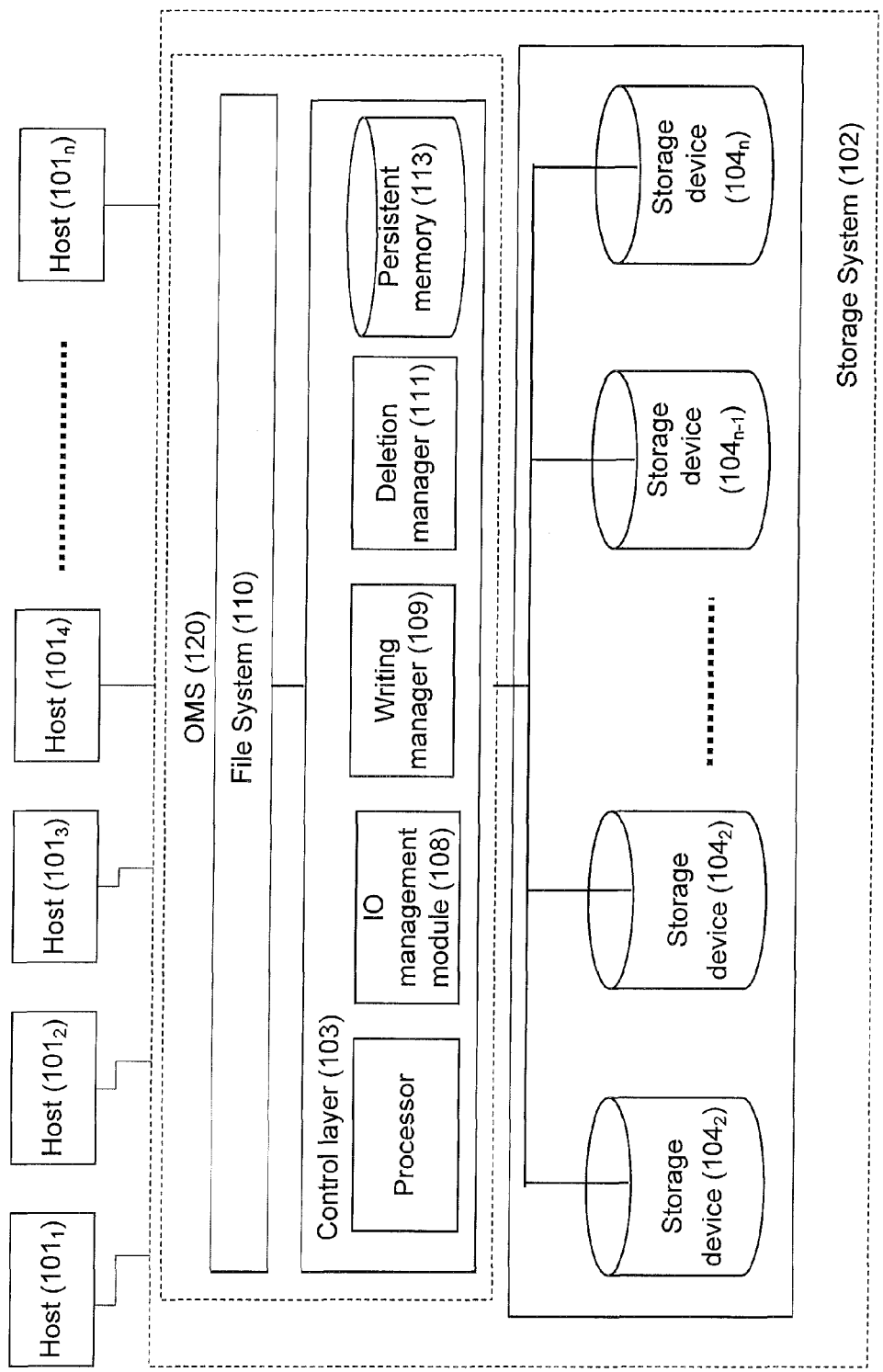
FIG. 1b illustrates a functional block diagram schematically illustrating another example of a computer storage system, according to the presently disclosed subject matter.
Figure 3:
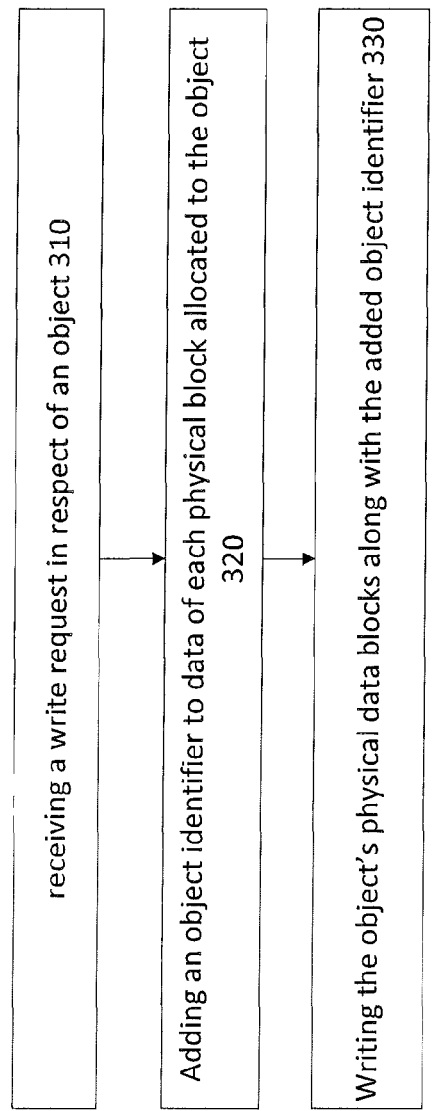
FIG. 3 is a flowchart illustrating sequence of operations carried out in response to a write request data, in accordance with the presently disclosed subject matter.

In embodiments of the presently disclosed subject matter, fewer, more and/or different stages than those shown in FIGS. 3 and 4 may be executed. In embodiments of the presently disclosed subject matter one or more stages illustrated in FIGS. 3 and 4 may be executed in a different order and/or one or more groups of stages may be executed simultaneously. FIGS. 1a and 1b illustrates a general schematic of the system architecture in accordance with an embodiment of the presently disclosed subject matter. The modules in FIGS. 1a and 1b may be centralized in one location or dispersed over more than one location. In other embodiments of the presently disclosed subject matter, the system may comprise fewer, more, and/or different modules than those shown in FIGS. 1a and b.

The presently disclosed subject matter includes a system and method which enables to execute a delete command of an object while eliminating the need for performing a consistency check of the file system after startup or for maintaining a journal file. According to the teachings disclosed herein, upon a system startup that follows an uncontrolled system interruption a deletion processes that has not been completed as a result of the system interruption, is repeated for those objects which were addressed by an interrupted delete request.

Attention is drawn to FIG. 1a, which shows a functional block diagram schematically illustrating a computer storage system, according to the presently disclosed subject matter. FIG. 1a depicts one or more host computers $101_{1-n}$ illustrated as sharing common storage means provided by storage system 102. A host ($101_{1-n}$) can be for example a workstation, an external server, a group of servers, a port in a server, a laptop or personal computer, etc. Connection between host computers $101_{1-n}$, and storage system 102 can be a direct connection and/or it may be established over a communication network.

The storage system comprises an object management system (OMS 120), which in this example includes a file-system 110, enables to logically represent to a client (host), data stored in the physical storage space, in terms of logical objects within a logical storage space. The logical objects may be data files, directories, access control lists (ACL), or any other file-system's object.

As demonstrated in FIG. 1a OMS 120 is connected to a plurality of data storage devices $104_{1-n}$ constituting a physical storage space optionally distributed over one or more storage nodes.

As demonstrated in FIG. 1b, OMS 120 can be optionally coupled to a storage control layer 103 interfacing between OMS 120 and data storage device $104_{1-n}$. Thus, OMS 120 can be directly coupled to storage devices $104_{1-n}$ or through a lower layer control layer 103.

Storage control layer 103 depicted in FIG. 1b comprises one or more appropriate storage control devices (not shown) operatively coupled to the plurality of data storage devices $104_{1-n}$ to file system 110 and/or to the plurality of host computers $101_{1-n}$. OMS in FIG. 1a can be associated with similar control devices.

It should be noted that the distribution of the functional elements between OMS 120 and control layer 103 which is illustrated in FIG. 1b represents one non-limiting example and the functional elements can be otherwise distributed. Furthermore, in some implementations different functional elements in OMS 120 are not necessary consolidated in a single physical unit and can be distributed in different unit and in different locations.

In general the functionalities which are stipulated below with reference to control layer 103 can be alternatively implemented by OMS 120.

In some cases control layer 103 (illustrated in FIG. 1b) and data storage devices $104_{1-n}$ can be consolidated in a system located at the same location, while in other cases part or all of data storage devices $104_{1-n}$ can be located at one or more remote locations and communicate with control layer 103 over some type of remote communication network (e.g. in a cloud computing system architecture). The storage control layer 103 and storage devices $104_{1-n}$ may communicate with host computers $101_{1-n}$ and within the storage system in accordance with any appropriate storage protocol.

Control layer 103 can be further operable to handle a virtual representation of physical storage space (i.e. virtual address space) and to facilitate mapping between the physical storage space and its virtual representation (i.e. a logical storage space). Control layer 103 can be configured to create and manage at least one virtualization layer interfacing between elements of the computer system (host computers, etc.) external to the storage system and the physical storage space. The virtualization functions may be provided in hardware, software, firmware or any suitable combination thereof. Optionally, a format of logical representation provided by control layer 103 may differ, depending on interfacing applications.

Elements within control layer 103 can be implemented as centralized modules operatively connected to the plurality of storage control devices or can be distributed over a part or all storage control devices. Optionally, the functions of control layer 103 may be fully or partly integrated with one or more host computers and/or storage devices and/or with one or more communication devices enabling communication between the hosts and the storage devices.

The entire address space of the storage system can be divided into logical volumes, and each logical volume becomes an addressable device. A logical volume (LV) or logical unit (LU) represents a plurality of data blocks characterized by successive Logical Block Addresses (LBA). Different logical volumes may comprise different numbers of data blocks, which are typically of equal size within a given system (e.g. 512 bytes).

Typically, definition of LUs in the storage system involves in-advance configuring of an allocation scheme and/or allocation function used to determine the location of the various data portions across the physical storage medium. The allocation scheme can be handled for example, by an allocation module being a part of the storage control layer 103. The location of various data portions allocated across the physical storage can be recorded and monitored with the help of one or more allocation tables linking between logical data addresses and their corresponding allocated location in the physical storage. Logical contiguity of successive portions and physical contiguity of the storage location allocated to the portions in the system are not necessarily correlated. As mentioned above, in cases where control layer 103 is absent, similar allocation schemes can be implemented by file-system 110 (e.g. with the help of a volume manager).

The physical storage space may comprise any appropriate permanent storage medium including, by way of non-limiting example, one or more Solid State Disk (SSD) drives, Hard Disk Drives (HDD) and/or one or more disk units (DUs) also called "disk enclosures", comprising several disk drives. The physical storage space comprises a plurality of data blocks (referred to herein as "physical data blocks"), each data block can be characterized by a pair ($DD_{id}$, DBA) where $DD_{id}$ is a serial number associated with the disk drive accommodating the data block, and DBA is a logical block number within the respective disk.

OMS 120 can comprise an I/O management module 108 for receiving and handling commands (including I/O commands and deletion commands) and enabling execution of the respective operations. I/O management module 108 can comprise or be otherwise associated with a writing manager 109 and a deletion manager 111.

According to one example, responsive to a write request received in I/O management module 108 in respect of a given object, writing manager 109 is configured to add to physical data blocks, associated with the given object, an object identifier, which enables to associate the physical data block to its respective logical object.

Most modern disk drives can be formatted with physical blocks that are slightly larger than the usual 512 bytes, typically 520 or 528 bytes physical blocks. These extra bytes can be used to hold the object identifier (e.g. a predetermined sequence of bits). Alternatively, the data written to the physical block can occupy less than the maximal block size, e.g.

can occupy 500 bytes out of 512 bytes, wherein the remainder of the physical block is reserved for object identifier or any other data that can be used for consistency checks. The block of data can be then written to the disk. Similarly to data blocks, metadata blocks, which store pointers to data blocks of the object, are also appended with an object identifier.

Figure 2:
FIG. 2 is a schematic illustration of an example of a data block with an appended object identifier, according to the presently disclosed subject matter.

FIG. 2 is a schematic illustration of an example of a physical data block 230 with an appended object identifier 240, according to the presently disclosed subject matter. Object identifier can include for example, an Mode number of a respective file or directory.

Deletion manager 111 is configured to execute deletion operations, in response to a delete request received in I/O management module 108 in respect of a given object.

For example, as mentioned above a B-tree data structure is often used for mapping offsets in an object into blocks of data in the volume (identified by LBAs). A leaf node of the B-tree, points to the data block (or to a starting point of an extent) and an index node (i.e. non-leaf node) points to respective metadata blocks which are referenced by the index node. Before the physical data blocks (hosting data blocks and metadata blocks) associated with a given object are written to the disks, an object identifier is appended to each block.

Operations of OMS 120 including the operations executed by I/O management module 108, writing manager 109 and deletion manager 111 are described below in detail, with reference to FIGS. 3 and 4.

Proceeding to FIG. 3 showing a flowchart illustrating sequence of operations carried out in response to a write request, in accordance with the presently disclosed subject matter. The operation described with reference to FIG. 3 can be performed for example by I/O management module 108 and writing manager 109.

At block 310 a write request in respect of a given logical object (e.g. a file) is received. At block 320 an object identifier (OID) identifying the given logical object is added to each physical block where the data included in the write request is written to. The write request may involve writing metadata of the logical object, for example when the block map is changed or augmented (e.g. when there is a need to add more blocks to the block map). In this case, the OID is also added to each physical block where the metadata, affected by the write request, is written to. The OID that is added to the physical block, enables to associate a physical block with its respective logical object. The physical blocks, together with the added OID, are written to the system's storage devices $104_{1-n}$ (block 330). For example, the OID can be appended to the data destined to a given physical block and writing together with the data to the physical storage.

Figure 4A:
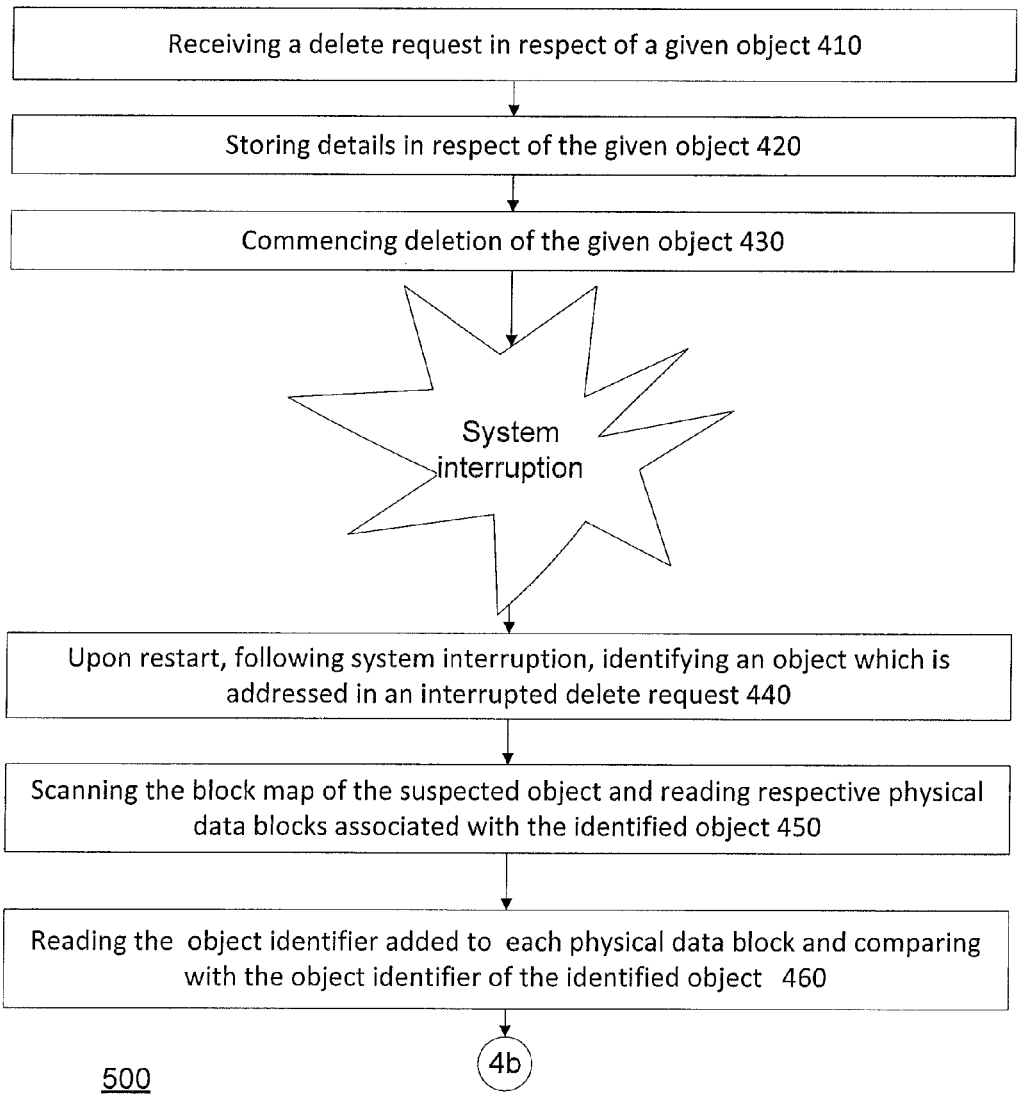
FIGS. 4a and 4b is a flowchart illustrating a sequence of operations carried out in response to a delete request, in accordance with the presently disclosed subject matter.
Figure 4B:
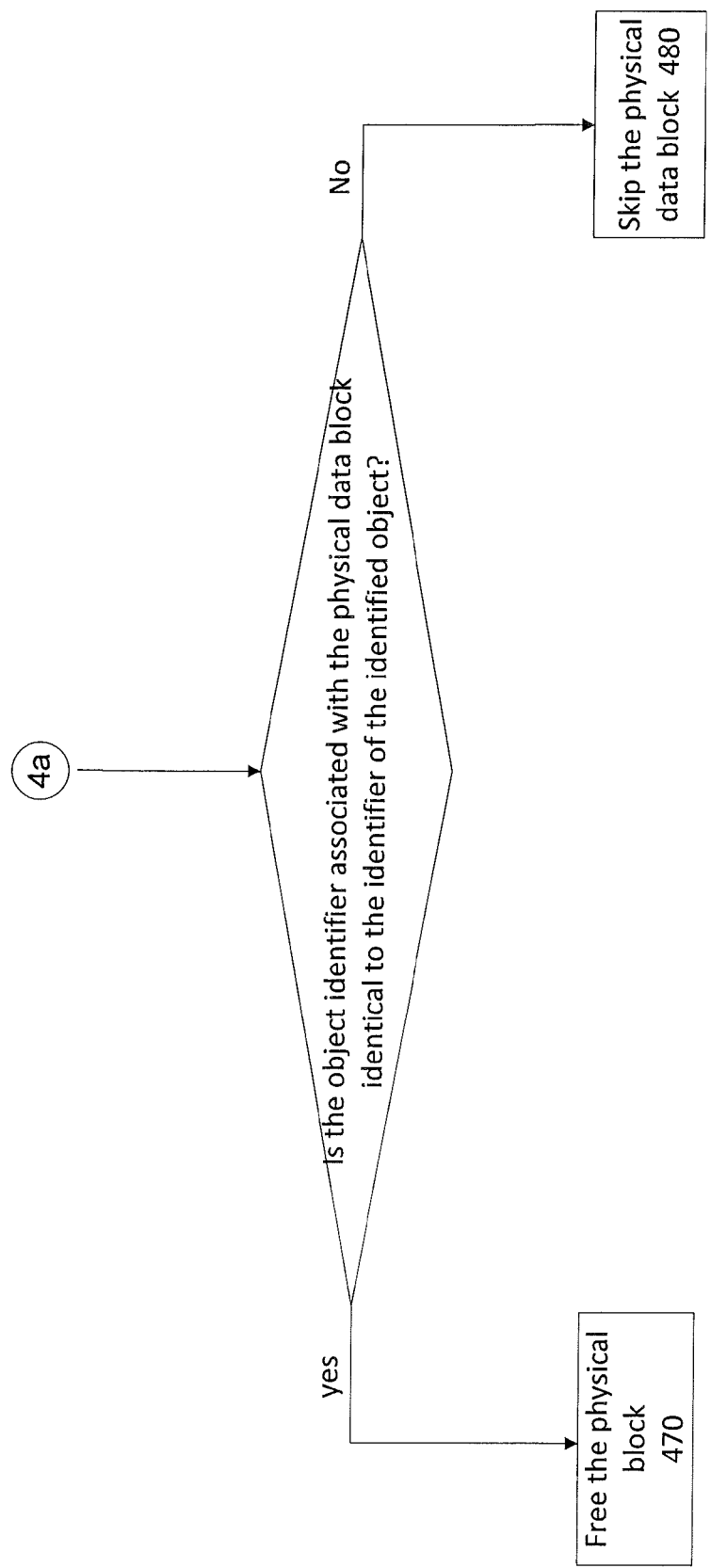

FIGS. 4a and 4b is a flowchart illustrating a sequence of operations carried out in response to a delete request, in accordance with the presently disclosed subject matter. The operation described with reference to FIG. 4 can be performed for example by I/O management module 108 and deletion manager 111.

At block 410 a delete request addressed to a given object is received. As mentioned above, I/O management module 108 can be configured to receive and process delete requests. According to the presently disclosed subject matter, details of an object that is addressed in a delete request are stored (block 420). For example, the relevant details can be written to persistent memory 113.

According to one example, a simple queue of objects (e.g. identified by their respective OIDs) that are waiting to be deleted ("delete pending" objects) are written to a persistent memory 113 (e.g. with the help of deletion manager 111).

According to another example, a designated data structure (referred herein as "trashcan") is created and managed in the persistent memory (e.g. with the help of deletion manager 111) for keeping track of the queue of delete pending objects. The information stored in the trashcan can include an object identifier (OID) of each object in the delete pending queue and a respective object state indicating whether an object in the trashcan is waiting to be deleted or is being currently deleted. The trashcan can include the entire content of the Mode of the object. The trashcan can be managed as a designated system directory (such as, for example, the recycle bin of Microsoft Windows) for accommodating objects that have been deleted but not yet permanently erased from the physical space.

Thus, in case a trashcan is implemented, responsive to a received delete request in respect to a given logical object, the object is moved to the trashcan. For example, if the object is identified by an Mode, in response to a delete request, the Mode is cleared from the Mode table and is added to the trashcan data-structure. The object in the trashcan can be associated with data indicating the current object state. An acknowledgment can be sent to the user (host) that initiated the delete request, immediately after moving the object to the trashcan.

A background process (managed for example by delete manger 111) is executed for deleting the objects residing in the trashcan, in case a trashcan is implemented, or in the queue of objects otherwise (block 430). When an object is selected for deletion its state is modified to indicate that it is currently being deleted. The background process traverses all the blocks of the object that is being deleted, with the help of the block map of the object (e.g. the respective B-tree) and unmaps all the associated blocks, e.g. mark the blocks as free and available for use by other objects. More than one object may be in a state of being deleted as the deletion process may be concurrently executed for more than one object. When the deletion process of an object is completed the deleted object is removed from the trashcan or queue. In case no system interruption occurs, the deletion of the objects continues until completion.

While an object deletion process is executed, write requests to other objects may be received and handled by OMS 120. A write request, running in parallel to the deletion process, may allocate a free block, previously allocated to a logical object that is being deleted and the free block was just marked as free during the deletion process, for writing new data of other logical objects. The write process may allocate the block that has been just freed before the deletion process is completed.

If a system interruption occurs during the deletion processes of a certain object, there is a need to make sure that all blocks of that object are deleted and deleting at least those blocks that have not been deleted prior to the system interruption. Since there is no information indicating, which blocks were freed and which are still allocated to the object, when repeating the deletion of an object a problem may occur, if blocks that have been deleted before the system interruption occurred were already allocated to other objects, as the repeated deletion of the object may result in the freeing of blocks now associated with a different logical object and not to the object that is being deleted.

According to the presently disclosed subject matter, previously stored information indicative of OIDs is utilized in order to delete only the physical blocks that are still allocated to the object that has been addressed in the interrupted delete request and avoid deletion of blocks that have already been allocated to other objects.

According to the presently disclosed subject matter, following a system interruption, upon restart of the system, objects that are addressed by an interrupted delete request (and thus are partially deleted) are identified (block 440).

Such objects can be identified based on the information indicating their respective state, e.g. those objects indicated in the trashcan as being in the state of "being currently deleted".

Alternatively, if the object state (which distinguishes objects waiting for deletion from objects being currently deleted) is not available or not implemented, all delete pending objects, which are written in persistent memory 113, are identified and considered as objects addressed in an interrupted delete request.

As described earlier with reference to FIG. 3, an object identifier is added to each block of data and metadata that is written to the storage device. The blocks linked to a given logical object, which is identified as being addressed in an interrupted delete request, are traversed with the help of the block map of the object (e.g. the respective B-tree) and the respective physical blocks (that can accommodate both data and metadata information) are read from the storage devices (block 450). The block map of the given logical object indicates the physical blocks that were linked to the logical object as part of handling write requests issued before the interrupted delete request has been issued.

The object identifier added to each physical block is read and compared to the object identifier of the given object (block 460). When using block extents, only the first block of each extent may be verified for the correct object identifier.

If the object identifier added to a physical block is identical to the identifier of the given object the block is freed (block 470) otherwise the block is skipped (block 480).

The operations specified in respect to blocks 440 to 480 can be repeated for every logical object that is identified as addressed by an interrupted delete request.

Thus, the presently disclosed subject matter provides an idempotent technique for deleting objects, which enables to repeat a deletion process interrupted by as a result of an uncontrolled system interruption, without using a journal file and without scanning all objects stored in the storage devices. Furthermore, the technique disclosed herein enables to avoid memory leaks or deletion of data blocks that are associated with another logical object.

FIGS. 1*a* and 1*b*, described above, illustrate a general schematic of the system architecture in accordance with an embodiment of the presently disclosed subject matter. Certain embodiments of the present invention are applicable to the architecture of a computer system described with reference to FIGS. 1*a* and 1*b*. However, the invention is not bound by the specific architecture; equivalent and/or modified functionality may be consolidated or divided in another manner and may be implemented in any appropriate combination of software, firmware and hardware. Those versed in the art will readily appreciate that the invention is, likewise, applicable to any computer system and any storage architecture implementing a virtualized storage system. In different embodiments of the invention the functional blocks and/or parts thereof may be placed in a single or in multiple geographical locations (including duplication for high-availability). As illustrated in FIGS. 1*a* and 1*b*, OMS 120 comprises or is otherwise associated with at least one processor operable for executing operations as described above. The term "processor" should be expansively construed to cover any kind of electronic device with data processing capabilities, including, by way of non-limiting example, a personal computer, a server computer, a computing system, a communication device, a processor (e.g. digital signal processor (DSP), a microcontroller, a field programmable gate array (FPGA), an application specific integrated circuit (ASIC), etc.), or any other electronic computing device, and or any combination thereof. Operative connections between the blocks and/or within the blocks may be implemented directly (e.g. via a bus) or indirectly, including remote connection. Connections between different components in illustrated in FIGS. 1*a* and 1*b*, may be provided via Wire-line, Wireless, cable, Internet, Intranet, power, satellite or other networks and/or using any appropriate communication standard, system and/or protocol and variants or evolutions thereof (as, by way of unlimited example, Ethernet, iSCSI, Fiber Channel, etc.).

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a (including non-transitory computer memory such as a hard drive or flash memory) machine-readable memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A method of deleting a logical object, the method comprising:
    upon a restart following a system interruption of a storage system, identifying a delete pending logical object, being addressed by an interrupted delete request, which has been interrupted as a result of the system interruption; wherein the delete pending logical object is identified by the interrupted delete request using an associated object identifier;
    performing a deletion, wherein the deletion comprising:
    reading one or more physical data blocks stored in a physical storage space and linked to the delete pending logical object, wherein each of the one or more physical data blocks comprises a stored object identifier;
    obtaining stored object identifiers comprised in the one or more physical data blocks;
    freeing first physical data blocks from among the one or more physical data blocks, if the first physical data blocks comprise first stored object identifiers that are identical to the associated object identifier; and
    avoiding freeing second physical data blocks from among the one or more physical data blocks, if the second physical data blocks comprise second stored object identifiers that are different from the associated object identifier.

2. The method according to claim 1 further comprising:
    receiving a write request in respect of a given logical object;
    allocating one or more free physical data blocks for writing data received in said write request;

adding to data to be written in each of the one or more free physical data blocks, a respective object identifier of said given logical object; and writing the data to each of said one or more free physical data blocks together with the respective object identifier.

3. The method according to claim 1 comprising:

in response to one or more delete requests, addressed to one or more logical objects, storing data indicative of said one or more logical objects, in a persistent memory.

4. The method according to claim 3 comprises storing said data indicative of said one or more logical objects as a queue of delete pending objects.

5. The method according to claim 3 comprises storing said data indicative of said one or more logical objects in a designated data structure; wherein said data includes at least an object identifier and an object state for each object of the one or more logical objects; wherein the object state indicating whether the object is pending for deletion or is being deleted.

6. The method according to claim 4 wherein said identifying of the delete pending logical object, comprises identifying the delete pending logical object in said queue of delete pending objects.

7. The method according to claim 5 wherein the identifying comprises searching in the designated data structure for a logical object associated with an object state indicating that the logical object is being deleted.

8. The method according to claim 1 wherein said object identifier is an inode number.

9. The method according to claim 1 wherein the one or more physical data blocks comprises all data and metadata blocks of said delete pending logical object and wherein the one or more physical data blocks are represented by a block map;

said deletion further comprising:

traversing said block map in order to identify the one or more physical data blocks.

10. An object management system coupled to a physical storage space; the physical storage space constituted of a plurality of physical data blocks stored in one or more storage devices; the object management system enabling to represent data stored in the physical storage space as one or more logical objects; the object management system comprising at least one processor and configured to:

upon a restart following a system interruption of the object management system, identify a delete pending logical object, being addressed by an interrupted delete request, which has been interrupted as a result of the system interruption; wherein the delete pending logical object is identified by the interrupted delete request using an associated object identifier;

perform a deletion, including:

read one or more physical data blocks stored in the physical storage space and linked to the delete pending logical object, wherein each of the one or more physical data blocks comprises a stored object identifier;

obtain stored object identifiers comprised in the one or more physical data blocks;

free first physical data blocks from among the one or more physical data blocks, if the first physical data blocks comprise first stored object identifiers that are identical to the associated object identifier; and avoid freeing second physical data blocks from among the one or more physical data blocks, if the second physical data blocks comprise second stored object identifiers that are different from the associated object identifier.

11. The object management system according to claim 10, wherein the delete pending logical object is part of including a file system.

12. The object management system according to claim 10, wherein said object management system is configured to:

receive a write request in respect of a given logical object; allocate one or more free physical data blocks for writing data received in said write request; add to data to be written in each of the one or more free physical data blocks a respective object identifier of said given logical object; and write the data to each of said one or more free physical data blocks together with the respective object identifier.

13. The object management system according to claim 10 is operatively coupled to a persistent memory and further configured to:

store data indicative of one or more logical objects, in said persistent memory, in response to one or more delete requests, addressed to said one or more logical objects.

14. The object management system according to claim 13 to store in said persistent memory the data indicative of the one or more logical objects as a queue of delete pending objects.

15. The object management system according to claim 13 is configured to store in said persistent memory the data indicative of the one or more logical objects in a designated data structure; wherein said data structure includes at least an object identifier and an object state for each object of the one or more logical objects; the object state indicating whether the object is pending for deletion or is being deleted.

16. The object management system according to claim 10 being integrated as part of a storage system.

17. A storage system comprising an object management system and a physical storage space; the physical storage space constituted of a plurality of physical data blocks stored in one or more storage devices; the object management system enabling to represent data stored in the physical storage space as one or more logical objects; the object management system comprising at least one processor and configured to:

upon a restart following a system interruption of the object management system, identify a delete pending logical object, being addressed by an interrupted delete request, which has been interrupted as a result of the system interruption; wherein the delete pending logical object is identified by the interrupted delete request using an associated object identifier;

perform a deletion, including:

read one or more physical data blocks stored in the physical storage space and linked to the delete pending logical object, wherein each of the one or more physical data blocks comprises a stored object identifier;

obtain stored object identifiers comprised in the one or more physical data blocks;

free first physical data blocks from among the one or more physical data blocks, if the first physical data blocks comprise first stored object identifiers that are identical to the respective associated object identifier; and avoid freeing second physical data blocks from among the one or more physical data blocks, if the second physical data blocks comprise second stored object identifiers that are different from the associated object identifier.

18. A non-transitory program storage device readable by machine, tangibly embodying a program of instructions that when executed by the machine cause the machine to perform method steps:

upon a restart following a system interruption of a storage system, identifying a delete pending logical object, being addressed by an interrupted delete request, which has been interrupted as a result of the system interruption; wherein the delete pending logical object is identified by the interrupted delete request using an associated object identifier;

performing a deletion, the deletion comprising:

reading one or more physical data blocks stored in a physical storage space and linked to the delete pending logical object, wherein each of the one or more physical data blocks comprises a stored object identifier;

obtaining stored object identifiers comprised in the one or more physical data blocks;

freeing first physical data blocks from among the one or more physical data blocks, if the first physical data blocks comprise first stored object identifiers that are identical to the associated object identifier; and avoiding freeing second physical data blocks from among the one or more physical data blocks, if the second physical data blocks comprise second stored object identifiers that are different from the associated object identifier.

* * * * *